US010648745B2

(12) United States Patent
Gernert et al.

(10) Patent No.: US 10,648,745 B2
(45) Date of Patent: May 12, 2020

(54) AZEOTROPIC WORKING FLUIDS AND THERMAL MANAGEMENT SYSTEMS UTILIZING THE SAME

(71) Applicant: Thermal Corp., Wilmington, DE (US)

(72) Inventors: Nelson J. Gernert, Elizabethtown, PA (US); John H. Rosenfeld, Lancaster, PA (US); Mark T. North, Lancaster, PA (US)

(73) Assignee: Thermal Corp., Wilmington, DE (US)

( * ) Notice: Subject to any disclaimer, the term of this patent is extended or adjusted under 35 U.S.C. 154(b) by 58 days.

(21) Appl. No.: 15/711,953

(22) Filed: Sep. 21, 2017

(65) Prior Publication Data

US 2018/0172359 A1  Jun. 21, 2018

Related U.S. Application Data (60) Provisional application No. 62/397,573, filed on Sep. 21, 2016.

(51) Int. Cl.
*F28D 15/04* (2006.01)
*C09K 5/04* (2006.01)
*C09K 5/20* (2006.01)

(52) U.S. Cl.
CPC ............. *F28D 15/04* (2013.01); *C09K 5/041* (2013.01); *C09K 5/20* (2013.01); *C09K 2205/102* (2013.01); *C09K 2205/132* (2013.01)

(58) Field of Classification Search
CPC ........... F28D 15/04; C09K 5/041; C09K 5/20; C09K 2205/102; C09K 2205/132
USPC .................................................. 165/104.26
See application file for complete search history.

(56) References Cited

U.S. PATENT DOCUMENTS

| 3,834,166 | A | 9/1974 | Cupper et al. |
| 3,841,099 | A | 10/1974 | Somekh |
| 4,358,930 | A | 11/1982 | Pope et al. |
| 6,432,320 | B1 | 8/2002 | Bonsignore et al. |
| 7,726,128 | B2 | 6/2010 | Oser et al. |
| 7,845,173 | B2 | 12/2010 | Oser et al. |
| 8,826,663 | B2 | 9/2014 | Irmler |
| 9,546,826 | B1 * | 1/2017 | Carter .................... F28D 15/046 |
| 2004/0047935 | A1 * | 3/2004 | Moss ...................... B29C 45/27 425/145 |
| 2006/0277910 | A1 | 12/2006 | Hoetger |
| 2011/0000649 | A1 * | 1/2011 | Joshi ..................... H01L 23/427 165/104.26 |

FOREIGN PATENT DOCUMENTS

| EP | 0071468 A1 | 2/1983 |
| GB | 1340009 A | 12/1973 |

OTHER PUBLICATIONS

AirEaseLeaks.org, "Test of the Performance of Heat Pipe Working Fluids," <https://aireaseleaks.org/azeotropic-heat-pipe-fluids> webpage accessed Mar. 23, 2016.

(Continued)

*Primary Examiner* — Joel M Attey
(74) *Attorney, Agent, or Firm* — Michael Best & Friedrich LLP (57) ABSTRACT

A thermal management system includes a heat transport component and a water-based azeotropic mixture disposed within the heat transport component to move heat from one portion of the heat transport component to another. The mixture includes at least 50% water.

9 Claims, 8 Drawing Sheets

(56) References Cited

OTHER PUBLICATIONS

Cole et al., "Organic Rankine-Cycle Power Systems Working Fluids Study: Topical Report No. 3—2-Methylpyridine/Water," Argonne National Lab, 1987.
Hnat et al., "Recovering Waste Industrial Heat Efficiently," Specifying Engineer, 1983, vol. 49, Issue 3, pp. 60-64.
Jungk et al., "Study of a binary critical mixture of 2,6-dimethyl pyridine/water: measurements of static and dynamic light scattering and specific heat near the lower critical point," German Bunsen Society for Physical Chemistry, 1987, vol. 91, Issue 5, pp. 507-516.
Marciniak et al., "Comparison of Rankine-Cycle Power Systems: Effects of Seven Working Fluids," Argonne National Lab, 1981.

\* cited by examiner

(from Abu Al-Rub and Datta, Chem. Eng. J. 81 (2001), pp. 83-89)

AZEOTROPIC WORKING FLUIDS AND THERMAL MANAGEMENT SYSTEMS UTILIZING THE SAME

CROSS-REFERENCE TO RELATED APPLICATIONS

This application claims priority to U.S. Provisional Application No. 62/397,573, filed Sep. 21, 2016, the entire contents of which are incorporated herein by reference.

BACKGROUND

Military aircraft (e.g., spacecraft) and other vehicles often use vapor compression (reverse-Rankine) cycle refrigeration systems, or other thermal management systems, to move heat from one location to another. The thermal management systems rely on working fluids such as ammonia, R12, R22, propane, R134a, and R152a, or other fluorocarbons and hydrofluorocarbons (HFCs) to move the heat. However, use of these types of working fluids may sometimes result in low thermal conductivity, low heat of vaporization, and low critical heat flux (CHF). Additionally, some of these working fluids are expensive, are weakly flammable, are difficult to biodegrade, contribute to greenhouse gases, and/or deplete ozone. Additionally, commercial and residential buildings also often use reverse-Ranking refrigeration system. Improved efficiency air conditioning systems are needed for these commercial and residential buildings. The refrigerant typically used in these applications is R-134A. This working fluid has nearly the lowest heat of vaporization of known working fluids. Still, it has become widely used because of its useful vapor pressure and its chemically inert, nonflammable characteristics. Unfortunately, fluorinated refrigerants, like R-134A, have high global warming potentials (often referred to as GWP, which is a relative measure of how much heat a greenhouse gas traps in the atmosphere, and which depends on absorption of infrared radiation by certain species, the spectral location of its absorbing wavelengths, and the atmospheric lifetime of the species), which has motivated a search for alternative refrigerants that have higher performance, are non-flammable, and possess low GWP.

Finding alternative working fluids has also become imperative based on several recent government and commercial initiatives, as well as potential future government and commercial initiatives (e.g., phasing out HFC's).

Water has previously been considered as a working fluid for thermal management systems. Water has over ten times higher heat transport capability than R-134A. Water has a significant drawback that has limited its use until present; its characteristic of expansion upon freezing creates a concern about damage and/or rupture of the thermal devices when exposed to sub-freezing temperatures. However, its high heat transport capability and non-toxicity make it attractive. Water is relatively inexpensive, is non-toxic, non-flammable, has a low ozone depletion potential (often referred to as ODP), has a low GWP, and offers high heat of vaporization, high CHF, and superior thermodynamic performance as compared to most common working fluids. However, water has a low density at low temperature, requires a high compression ratio, and results in high compressor outlet temperatures. Additionally, and as noted above, there is a significant volume expansion that occurs with water upon freezing, which is exacerbated by a relatively high freezing point. Such expansion results in the potential damage and/or rupture of heat transport components. Thus, it would be beneficial if a working fluid could be used that offers the various advantages of water without the problems associated with water, particularly in light of the low temperatures at which many military aircraft and spacecraft operate.

SUMMARY

In accordance with some embodiments of the present invention, a thermal management system includes a heat transport component and a water-based azeotropic mixture disposed within the heat transport component to move heat from one portion of the heat transport component to another. The mixture includes at least 50% water.

In accordance with still other embodiments of the present invention, a thermal management system includes a heat transport component and a water-based azeotropic mixture disposed within the heat transport component to move heat from one portion of the heat transport component to another. The mixture includes both water and an organic compound such as n-propanol or pyridine. The composition of water and pyridine mixture is between 0.68 and 0.82 mol/mol (i.e., molar percentage), such that the water and pyridine do not separate during a transition between a liquid phase and a vapor phase. For the n-propanol/water mixture, the composition is between 0.45 and 0.65 mole percent.

In accordance with still other embodiments of the present invention, a method of moving heat in a heat transport component includes receiving heat at an evaporator region of the heat transport component, directing the heat into a working fluid within the heat transport component, wherein the working fluid is a water-based azeotropic mixture, and moving the heat to a condenser region of the heat transport component with the working fluid.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

With reference to FIGS. 1-9, a promising new class of working fluids has been identified for use in thermal management systems. These new working fluids are water-based azeotropes, including water/pyridine, water/butanol, and water/n-propanol (in some embodiments the water component being de-ionized water). It has been found that such working fluids are non-toxic, environmentally-safe, high performance working fluids that may be used in thermal management systems in both military and commercial applications.

Figure 1:
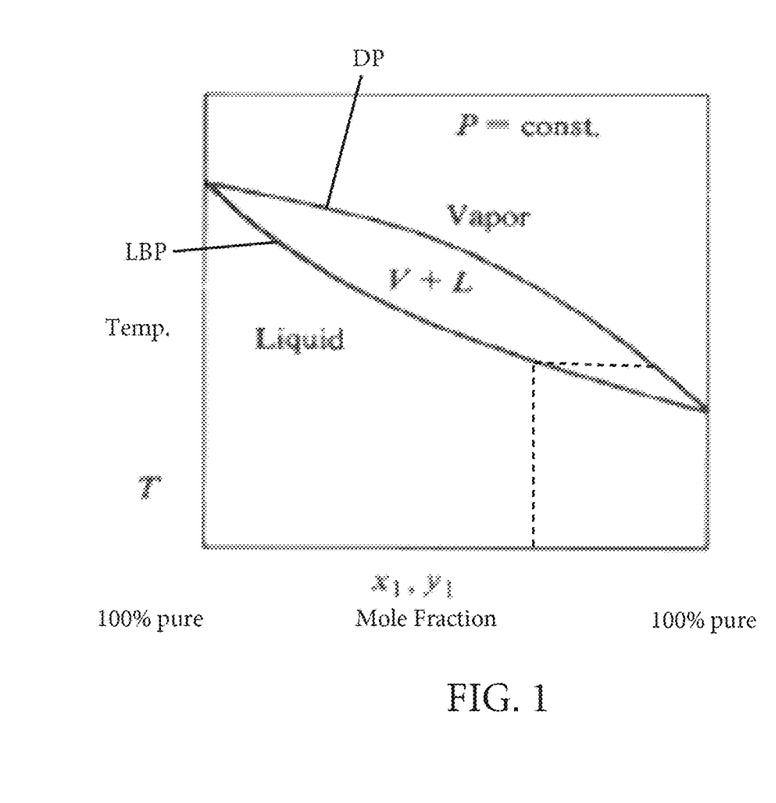
FIG. 1 is a graphical illustration of an example of a normal zeotropic system that includes a mixture of two components.
Figure 2:
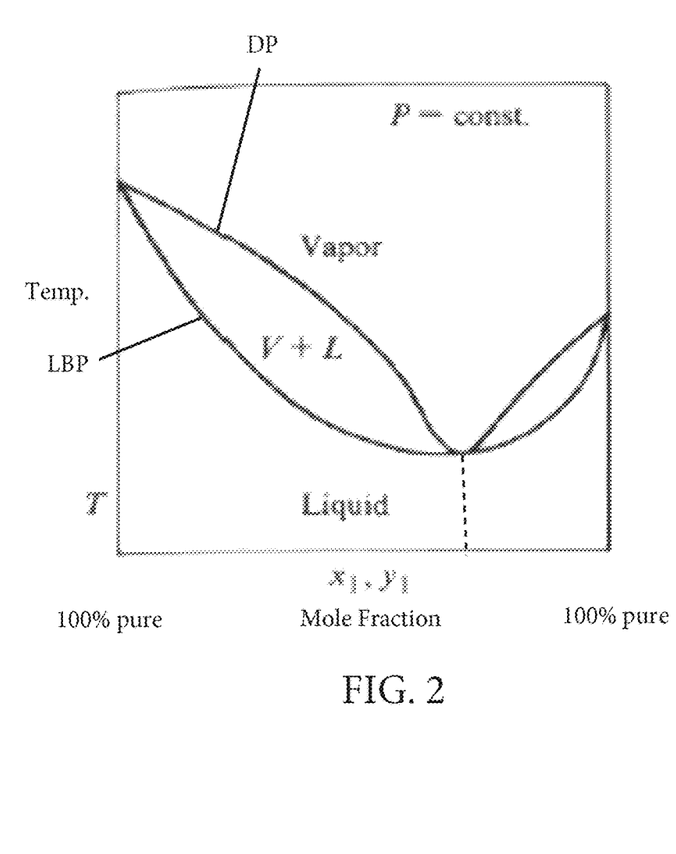
FIG. 2 is a graphical illustration of an example of an azeotropic system that includes a mixture of two components.

With reference to FIGS. 1 and 2, an azeotrope is a mixture of two or more components that have the same composition in both the liquid and vapor phases, and exhibit a single boiling point. Thus it behaves as a single pure component working fluid, where the components do not separate. For example, FIG. 1 is a graphical illustration of a system that includes a mixture of two components (represented by x1 and y1, respectively, where x1 represents the mole fraction of the first component, and y1 represents the mole fraction of the second component). At a constant pressure, the composition of the two components changes from a liquid phase to a vapor phase. Thus, at any particular composition selected along the graph (aside from pure x1 or pure y1 on the far right and far left of the graph, respectively), one can move vertically upwards along the selected composition (see the vertical dashed line in FIG. 1) until a liquid boiling point line LBP is reached (i.e., the bottom solid line (sometimes referred to as "bubble point") in FIG. 1). Then moving horizontally along the graph along the same temperature (see the horizontal dashed line in FIG. 1), one can determine the composition of the vapor that is formed at a top "dew point" solid line DP in FIG. 1. As illustrated in FIG. 1, there is always a shift in the composition when this occurs, such that the mole fractions of the first component x1 and the second component y1 are different in the vapor phase than in the liquid phase.

In contrast, FIG. 2 is a graphical illustration of an example of a system that includes a mixture of two components x1 and y1. Note that the LBP line intersects the DP line at a particular composition of x1, y1. Thus, at this composition (see the vertical dashed line in FIG. 2), when the composition is heated to its boiling temperature, the composition remains exactly the same in the vapor phase as it was in the liquid phase. This composition is considered to be an azeotrope.

There are a variety of different types of azeotropic systems, including minimum boiling point azeotropic systems, as well as maximum boiling point azeotropic systems. FIG. 2 is an example of a minimum boiling point azeotropic system, where if a particular composition is selected, moving to the resulting vapor on the graph (i.e., moving horizontally along the same temperature once the bubble point line is reached) causes one to move closer to the azeotrope (i.e., where the bubble point line and the dew point line intersect on the graph). Conversely, with a maximum boiling point azeotropic system, if a particular composition is selected and one moves along the same temperature to the resulting vapor, one is moving away from the azeotrope. Selection of the particular system may be application-dependent.

Azeotropic systems may have more than two components in the mixture. For example, while the graph in FIG. 2 illustrates an azeotropic system having two components, other azeotropic systems have more than two components. Azeotropic systems may therefore be described for example as binary, ternary, etc. Over 15,000 known binary and ternary azeotropic systems exist. Additionally, some azeotropic systems exhibit an immiscible region over a part of the composition range, where an organic-rich and a water-rich phase both exist together (e.g., a system with a water/butanol mixture). Other azeotropic systems do not exhibit an immiscible region (e.g., systems with a water/pyridine mixture or a water/n-propanol).

Figure 3:
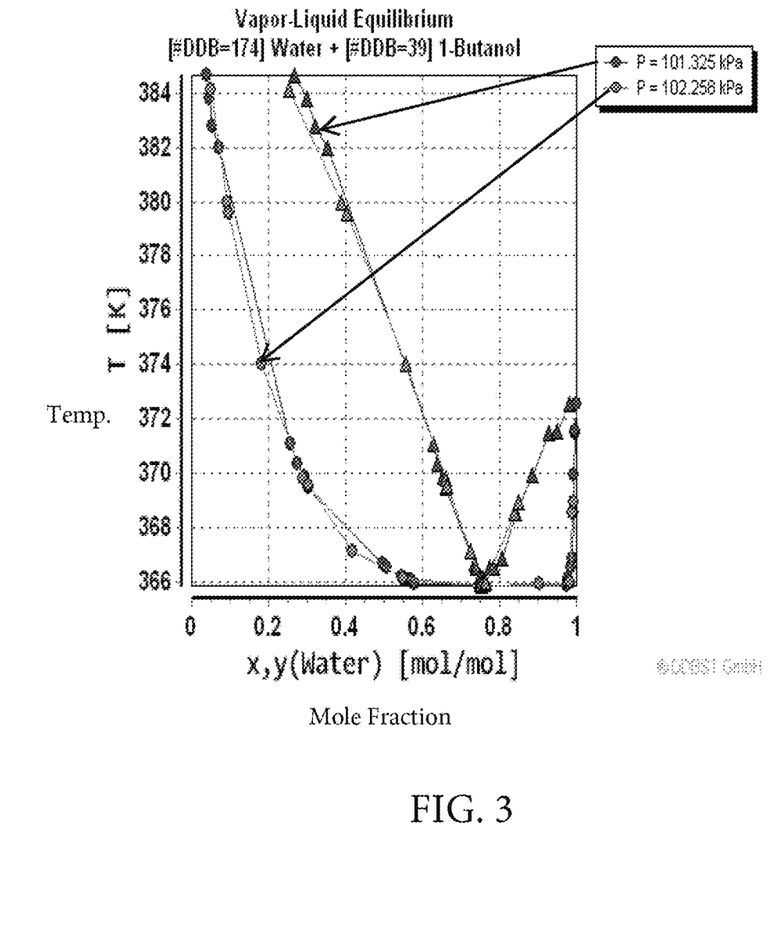
FIG. 3 is a graphical illustration of a water/butanol azeotropic system.

FIG. 3 is a graphical illustration of a water/butanol azeotropic system. As illustrated in FIG. 3, the azeotrope in this system occurs at a composition of water/butanol between approximately 0.7 and 0.8 mol/mol.

Figure 4:
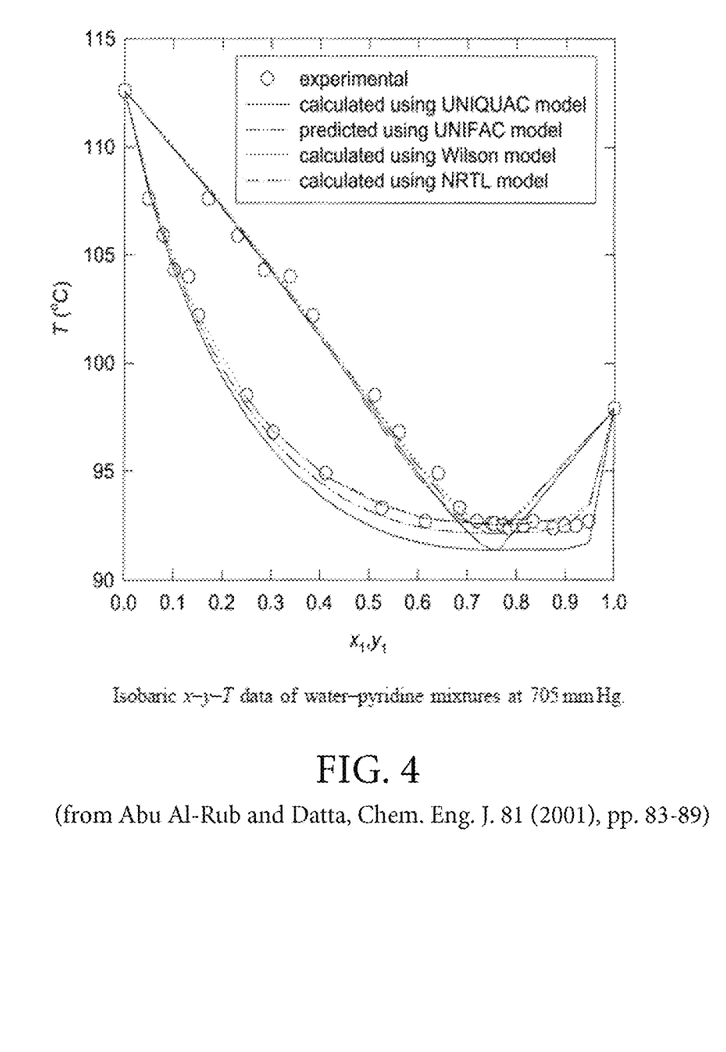
FIG. 4 is a graphical illustration of a water/pyridine azeotropic system.

FIG. 4 is a graphical illustration of a water/pyridine azeotropic system. As illustrated in FIG. 4, the azeotrope in this system occurs between approximately 0.68 and 0.82 mol/mol, depending on the model used for calculation (image taken from Abu Al-Rub and Datta, Chem. Eng. J. 81 (2001), pp. 83-89)

Figure 5:
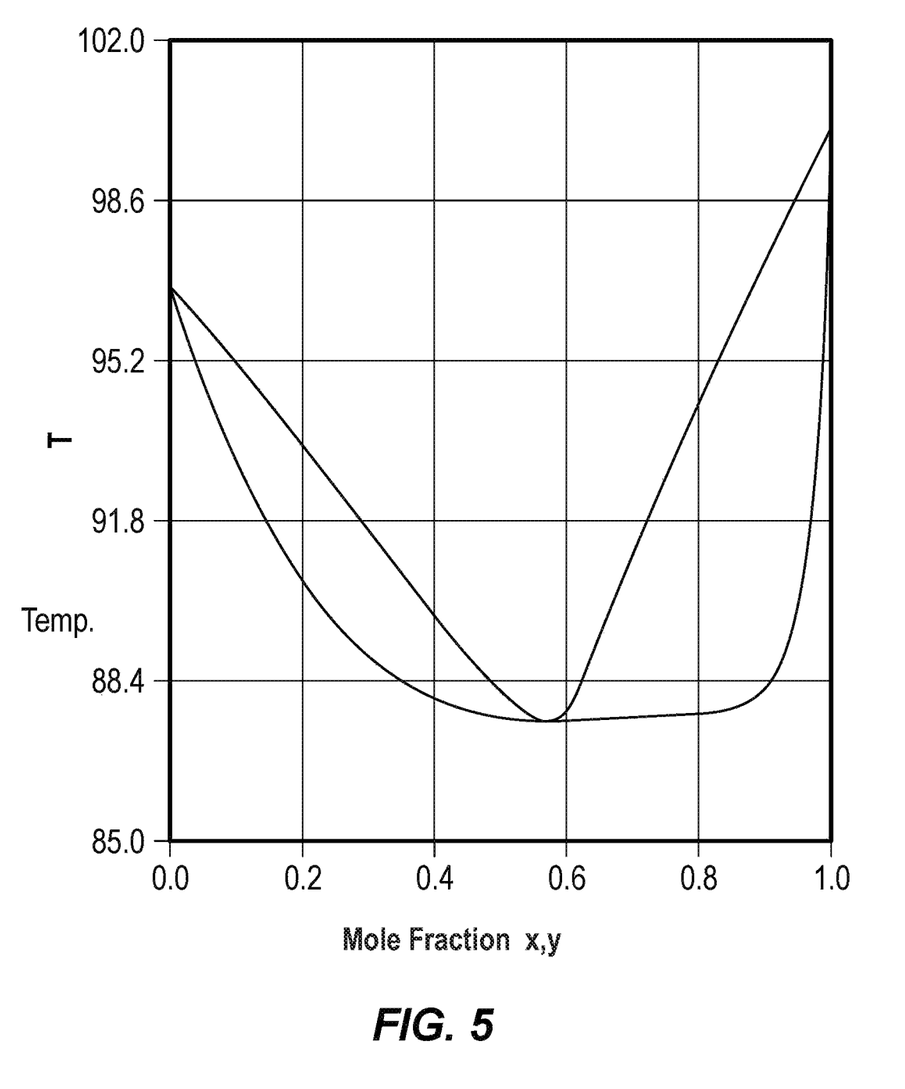
FIG. 5 is a graphical illustration of an water/n-propanol azeotropic system.

FIG. 5 is a graphical illustration of a water/n-propanol azeotropic system. As illustrated in FIG. 5, the azeotrope in this system occurs at a composition of water/n-propanol between 0.6 and 0.8 mol/mol.

Figure 6:
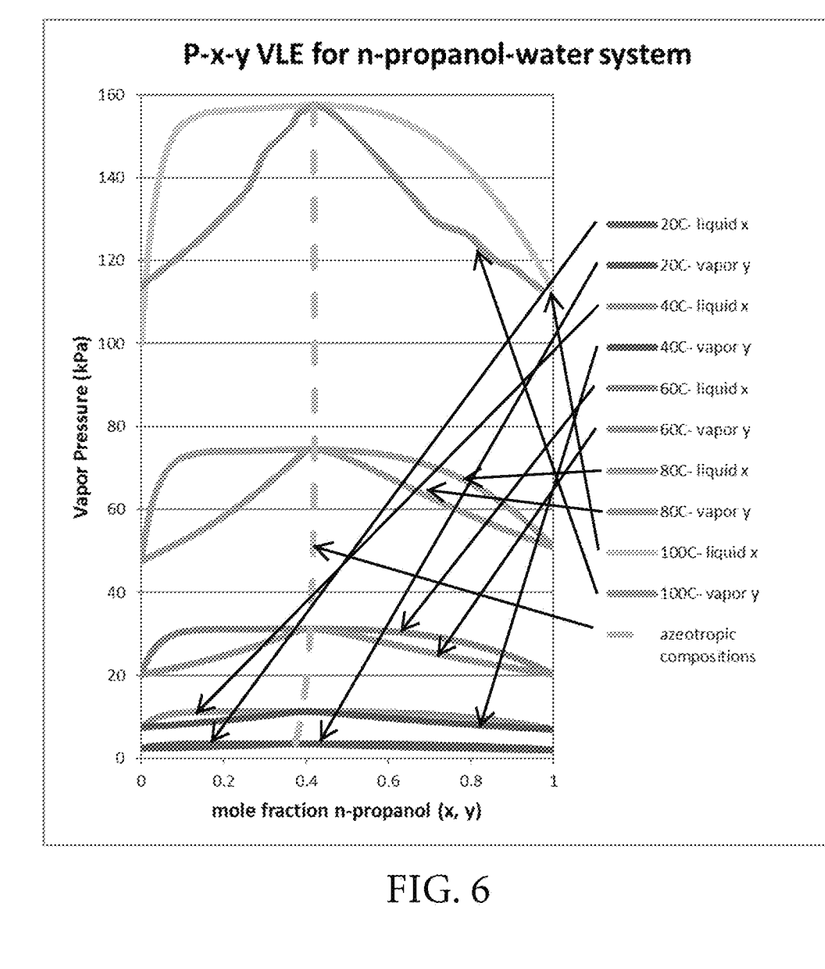
FIG. 6 is a graphical illustration of the water/n-propanol azeotropic system at various constant pressures.

FIG. 6 is a graphical illustration of an n-propanol/water azeotropic system at various constant pressures. As illustrated by the dashed line in FIG. 6, the azeotropes all generally occur around approximately 0.4 mol/mol.

It has been discovered that these and other water-based azeotropes exhibit favorable properties for use as working fluids in thermal management systems. For example, water-based azeotropes include some of the qualities found with water alone, such as low mass flow rate due to high net evaporation, high heat flux capability, low working pressure, low GWP, low ODP, and low cost.

Water-based azeotropes also include qualities not found with water alone, or with other working fluids. For example, water-based azeotropes exhibit high heat transport capabilities between 25° C. and 300° C. (higher than any other fluid except water itself). Water-based azeotropes also have low temperature drop associated with evaporation or condensation. Rather, they exhibit a sharp boiling point, much like single-component fluids. Water-based azeotropes also have a significantly low freezing point (in some embodiments as low as −15° C., and in other embodiments as low as −40° C., −100° C., or lower), resulting in a low likelihood of freezing and the resulting problems associated therewith. Some water-based azeotropes also do not expand upon freezing (unlike water), again reducing the problems associated with water as described above. Some water-based azeotropes may decrease slightly in volume upon freezing, or will not change significantly in volume. For example, Applicants have performed work that shows that water-based azeotropes are capable of surviving freeze/thaw thermal cycling that water itself cannot survive. For example, in one test, two sealed copper tubes were 10% filled with n-propanol/water azeotrope; two other identical vessels were 10% filled with DI water. All four units were thermal cycled as copper heat pipes between 90° C. and −40° C. for 12 cycles. The two water-filled tubes developed envelope ruptures, whereas the azeotrope-filled devices exhibited no detrimental effects.

Water-based azeotropes also freeze over a range of temperatures, avoiding a sudden creation of stress inside of a containment vessel in a thermal management system. Some water-based azeotropes have low pour points (temperatures at which the mixture becomes semi-solid and loses its flow characteristics). Some water-based azeotropes also generate vapor pressure that is significantly higher than water, which extends the working fluid operating range to lower temperatures than water itself. Water-based azeotropes also include fluids that have low toxicity and are not HAZMATs (hazardous materials and items). Water-based azeotropes also are environmentally friendly and do not deplete greenhouse gases or ozone.

It has been discovered that water-based azeotropes may be used not only in vapor compression cycle refrigeration systems (including those that exceed the baseline R-134a), but also in other thermal management systems including Rankine cycle power generation systems (e.g. power plants), heat pipes (e.g., axially-grooved heat pipes for aircraft, and/or high performance, freeze-proof heat pipes), loop heat pipes (e.g., for spacecraft and gimbaled targeting pod electronics), pulsating heat pipes, pumped single and two-phase pumped loops, thermosyphons, loop thermosyphons, high temperature air conditioning systems (e.g., military aircraft electronics cooling systems), refrigeration systems for use in manned areas, and others. Other applications for this technology include, for example, military and commercial vehicle air conditioning systems and building HVAC systems.

With respect to heat pipes in particular, heat pipes are thermodynamically similar to a Rankine cycle. Heat moves from high temperature to low temperature. However, no net work is produced. A heat transport capability of a working fluid in a capillary-pumped heat pipe corresponds to a Liquid Transport Factor (kW/cm$^2$), which is a function of only temperature for each fluid. An expression for the Liquid Transport Factor is defined as $N_L=\rho\lambda\sigma/\mu$, where $N_L$ is the Liquid Transport Factor, $\rho$ is the liquid density, $\lambda$ is the heat of vaporization, $\sigma$ is the surface tension, and p is the liquid viscosity. Liquid Transport Factors are significant with respect to heat pipe systems, whereas coefficients of performance (COP) are significant with respect to air conditioning systems. In some embodiments, a working fluid thermal capability is defined by a coefficient of performance (COP), where $COP=Q_e/W_{comp}$, $<T_{COLD}/(T_{HOT}-T_{COLD})$. The COP is different for each refrigeration application, and may be evaluated from fluid specific enthalpies.

Figure 7:
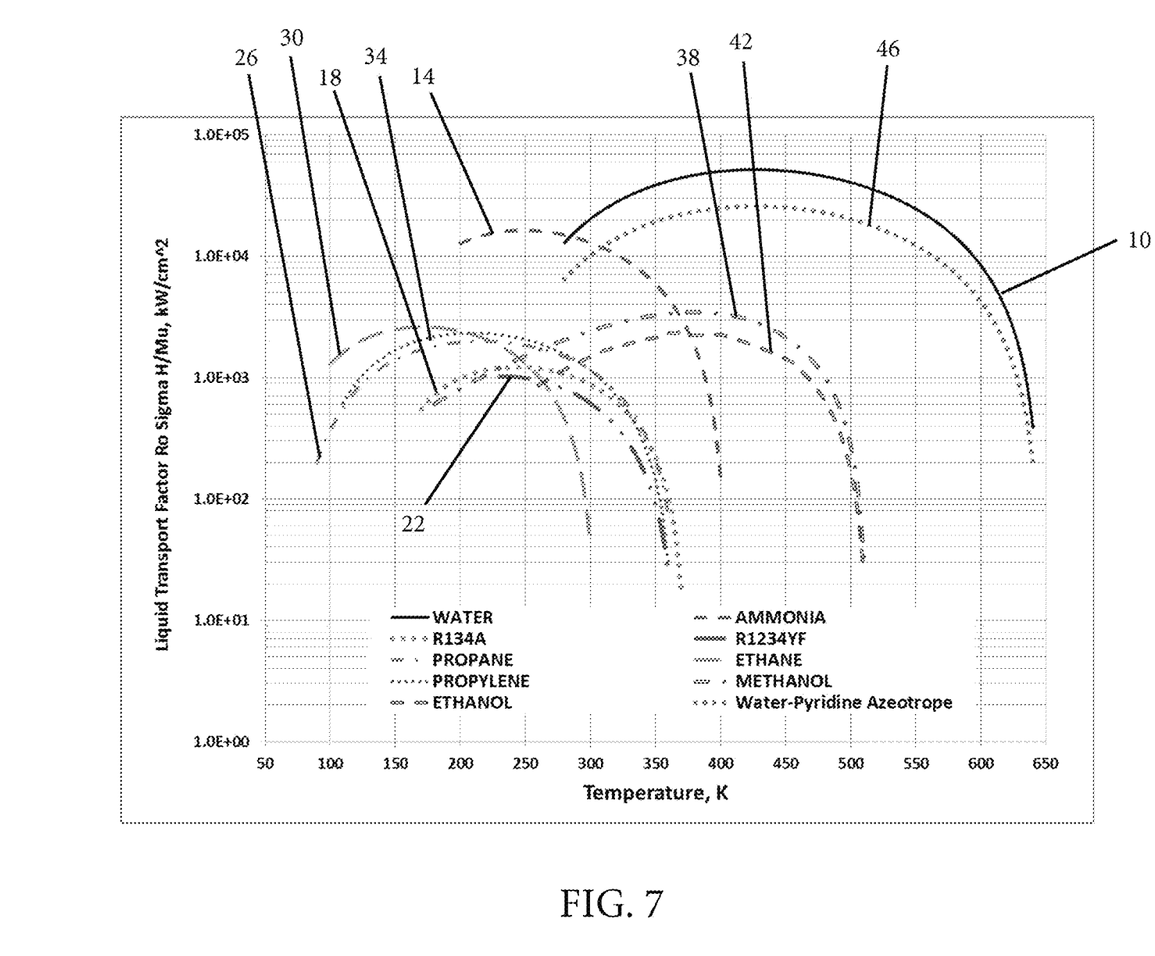
FIG. 7 is a graphical illustration of various working fluids and their Liquid Transport Factor.

With reference to FIG. 7, water-based azeotropes exhibit high heat transport capability between 25° C. and 300° C. (higher than any other fluid except water itself). For example, FIG. 7 illustrates the Liquid Transport Factor for each of a variety of different working fluids, including de-ionized water 10, ammonia 14, R134A 18, R1234YF 22, propane 26, ethane 30, propylene 34, methanol 38, ethanol 42, and water/pyridine 46. As illustrated in FIG. 7, water has over ten times higher heat transport capability than other working fluids such as methanol and ethanol. The water/pyridine mixture 46, however, has a heat transport capability that closely matches water. For example, as illustrated in FIG. 7, the Liquid Transport Factor for water/pyridine 46 is greater than 10,000 at a temperature of 450K and is greater than 1000 at a temperature of 600K, similar to water. In some embodiments, water-based azeotropes (including water/pyridine, water/propanol, or any water-based azeotrope containing at least 10% water) exhibit about 50% of the heat transport capability of water, such that the heat removal capability of the water-based azeotrope is still up to five times higher than other known working fluids except de-ionized water itself.

Figure 8:
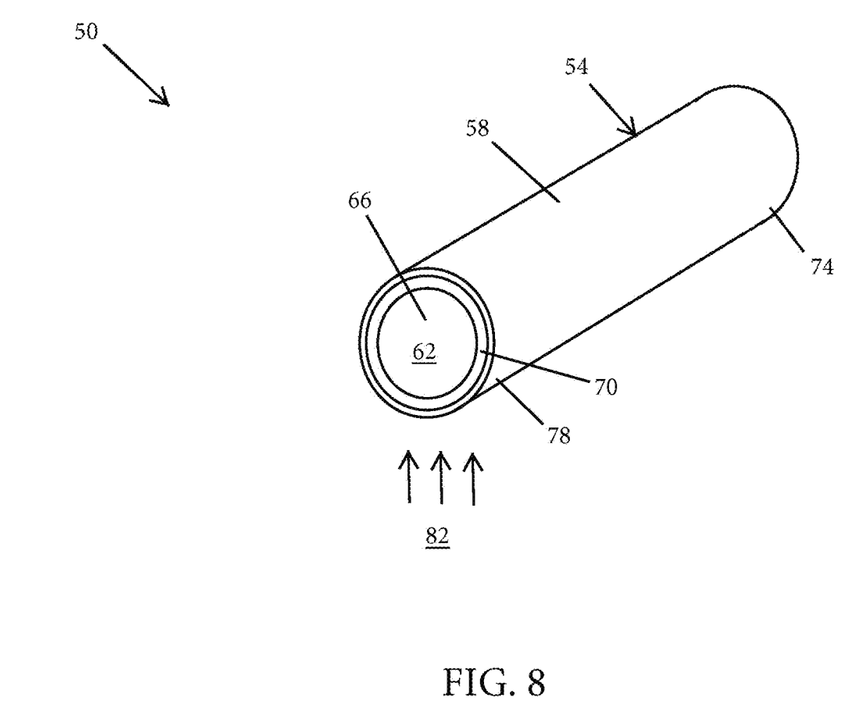
FIG. 8 is a schematic illustration of a heat pipe.
Figure 9:
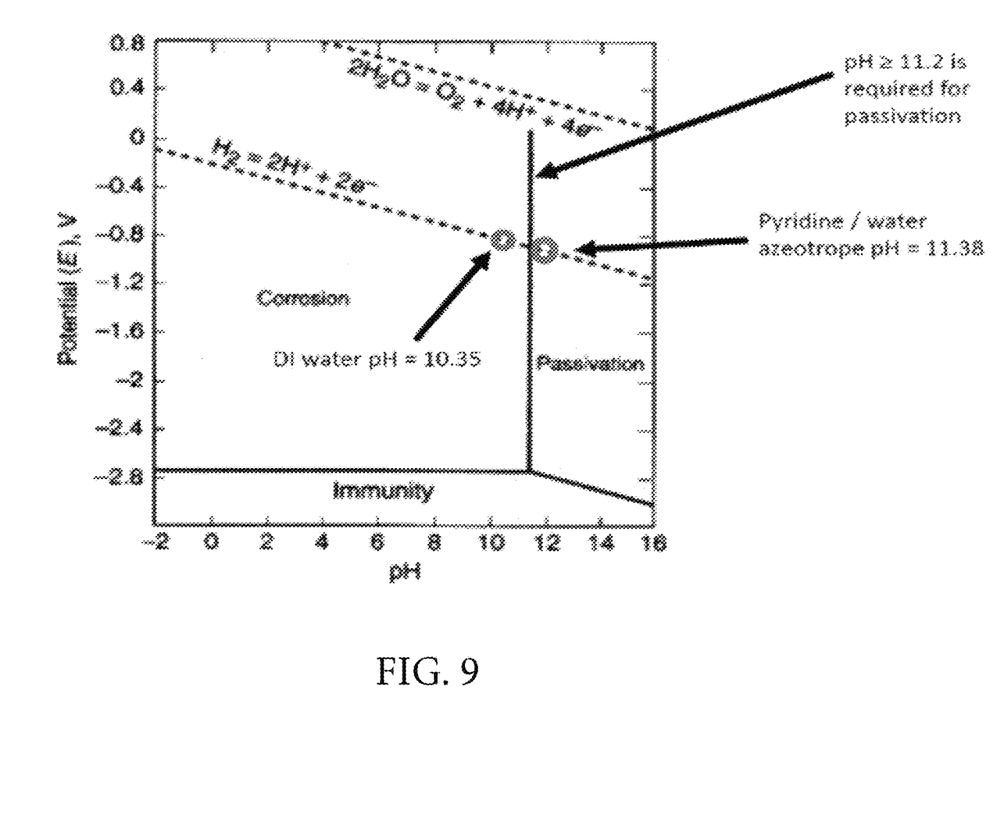
FIG. 9 is a graphical illustration of the passivation that may be achieved with a water-based azeotrope inside of a heat pipe.

FIGS. 8 and 9 schematically illustrate an example of a thermal management system 50 having at least one heat transport component 54. In the illustrated construction the heat transport component 54 is a heat pipe having an outer wall 58 defining an interior 62 through which a water-based azeotropic working fluid 66 (e.g., water/pyridine) moves. In the illustrated construction the heat transport component 54 includes a wick structure 70 (e.g., a capillary structure, such as fused silica or other material) adjacent an interior of the wall 58 to facilitate movement of a condensed form of the working fluid 66 from a condenser region 74 of the heat transport component 54 to an evaporator region 78 of the heat transport component 54. The working fluid 66 absorbs heat from a heat source 82 (e.g., electronics component such as printed circuit board or other electronics component) at the evaporator region 78, causing the working fluid 66 to vaporize and move toward the condenser region 74, where the working fluid 66 is then cooled, condensed, and again returned via the wick structure 70 to the evaporator region 78. In some embodiments the heat transport component 54 does not include a wick structure 74. Other embodiments of heat transport components 54 include for example axially-grooved heat pipes for aircraft, loop heat pipes (e.g., for spacecraft and gimbaled targeting pod electronics), pulsating heat pipes, pumped single and two-phase pumped loops, thermosyphons, loop thermosyphons, Rankine cycle power generation systems, high temperature air conditioning systems (e.g., military aircraft electronics cooling systems), refrigeration systems for use in manned areas, military and commercial vehicle air conditioning systems, and building HVAC systems. The water-based azeotropic working fluid 66 may be used to move heat from one portion of the heat transport component 54 to another in each of the heat transport components 54 described above.

With reference to FIGS. 8 and 9, it has been found that some water-based azeotropes raise the level of pH within the thermal management system 50, thereby reducing or eliminating corrosion. For example, it has been found that when the working fluid 66 is a water-based azeotrope (in particular water/pyridine), and where the material of the heat transport component 54 (e.g., the material of the wall 58) is magnesium, that a chemical breakdown occurs as follows within the heat transport component 54:

Magnesium/Pyridine-Water Azeotrope System:

In some embodiments, the partial dissociation of pyridine (a weak base) raises the pH in the system enough (e.g., over one pH) to induce intrinsic passivation of a wetted, interior surface of the wall 58 (e.g., if there is only one mold on an inner wetted surface). For example, as FIG. 9 illustrates, a pH of greater than 11.2 causes intrinsic passiviation. Use of de-ionized water itself as a working fluid results a pH of 10.35, but use of water/pyridine as a working fluid results a pH of 11.38, thereby causing intrinsic passivation. Intrinsic passivation of the interior surface of the wall 58 advantageously suppresses or prevents hydrogen gas generation, and thus reduces or prevents corrosion in the heat transport component 54 (or other structure through which the water-based azeotropic working fluid 66 passes).

The use of water-based azeotropes also increases the potential to induce passivation and chemical compatibility with structural materials other than magnesium, including materials that are not compatible with water itself (e.g., aluminum, stainless steel, titanium, polymers, etc.). For example, water-based azeotropes may wet untreated polymer material such as high density polypropylene and polyethylene, whereas de-ionized water does not wet these materials. This enables the use of such lightweight materials for the heat transport component 54 or other structure in the thermal management system 50. In some embodiments, both water-based azeotropes and de-ionized water may be compatible with the same materials. For example, water/alcohol azeotropes exhibit lower pH than de-ionized water, and along with de-ionized water are likely to be compatible with materials such as copper and copper alloys.

As described above, water-based azeotropes advantageously do not separate during evaporation and condensation. Thus, the temperature drop in the heat transport component 54 or other device may be as low as that observed for a pure component working fluid such as de-ionized water.

Additionally, as described above, some water-based azeotropes have low freezing points (e.g., well below 0° C.), low pour points (e.g., well below 0° C.), and high heat transport capability. Thus, water-based azeotropes may continue to operate and carry heat at temperatures well below 0° C. in the heat transport component 54. The water/n-propanol azeotrope has a vapor pressure curve nearly 50% higher than water. (FIG. 5 illustrates a 1 atmosphere VLE diagram; for n-propanol/water, the azeotrope NBP may be 88° C., not 100° C., considering that pure water vapor pressure at 88° C. is 9.34 psi which equates to 1.57 atm, so at 1 atm the azeotrope is 57% higher). This has a significant favorable effect on the heat transport capability, especially at lower operating temperatures. The 12° C. boiling point depression of this azeotrope is the mixture property responsible for this effect.

In some embodiments, where water-based azeotrope vapor pressure is similar to water itself, the wall 58 of the heat transport component 54 does not need a heavy wall construction. This enables more heat rejection for many applications (e.g., spacecraft) with lower mass.

It has been discovered that specific water-based azeotropes may be selected for use as working fluids based on their particular properties. For example, water-based azeotropes may be selected for their particular vapor and liquid viscosity, heat of vaporization, surface tension, thermal conductivity, pH level, or freezing point range (including ranges that extend below −125° C.). In some embodiments, the water-based azeotropes can include at least 50% (by weight) water in the composition, to improve safety requirements.

In some embodiments, water/pyridine may be selected as the water-based azeotrope. As described above, this mixture has a high heat transport capability that more closely matches de-ionized water. This mixture also increases passivation inside the heat transport component 54 or other structure in a thermal management system.

In some embodiments, water/butanol may be selected as the water-based azeotrope. This mixture exhibits a heat transport capability of about 50% of that of de-ionized water, but with no expansion upon freezing. This offers the potential to eliminate freeze/thaw concerns for use of water in high-power vapor cycles for aerospace and other applications. Additionally, a water/butanol azeotrope is relatively non-toxic and not flammable, making it safe for use in many applications (e.g., manned aircraft applications).

In some embodiments, n-propanol may be selected as the water-based azeotrope. This mixture is an example of a minimum boiling point azeotrope, and has vapor pressure that is approximately 50% higher than pure water at the same temperature, thus resulting in high vapor density. The freezing point range for this mixture is between approximately −75° C. and −125° C., which makes this water-based azeotrope ideal for low-temperature thermal management systems used in aircraft and spacecraft.

Overall, water-based azeotropes may be selected to provide improved performance, reliability and operation for thermal management systems, and to improve capability for thermal transport, heat rejection, efficiency, to decrease mass, improve temperature range, and/or improve survivability (e.g., avoiding a freeze/thaw rupture that may destroy the thermal management system).

As noted above, Applicants have discovered the potential of the water-based azeotropes described herein to specifically reduce primary energy consumption of reverse Rankine cycle air conditioning systems. This innovation is especially relevant to server farms housed in commercial buildings. Water azeotropes have been recognized as a potentially useful Rankine cycle working fluid (G. S. Somekh, "Water-Pyridine is an Excellent Rankine Cycle Fluid," J. Eng. For Power, October 1975). However, this class of working fluids remained unstudied until present as possible reverse Rankine cycle refrigerants for air conditioning systems. Applications may include electronics cooling and commercial building air conditioning systems, heat pipes and related devices.

Reduced energy consumption and elimination of a significant greenhouse gas source are direct benefits of using the water-based azeotropes described herein, especially for internet/server computer farms and related sites where large air conditioning loads are required for electronics cooling. Internet servers have become a large portion of electrical power consumption. The high heat of vaporization of water azeotropes enables a reduction in power consumption (e.g., of a compressor) of at least 10%/o to 20%, compared to R-134A. In some embodiments, use of the water azeotropes is able to reduce compressor power requirements by 10% to 20% to produce equivalent building air conditioning, although other embodiments include different values and ranges (e.g., up to 10%, or greater than 20%).

As described above, an azeotrope is a mixture of two or more fluid components that exhibit a single sharp boiling point, wherein the chemical composition of the vapor and liquid is identical. Thus, it behaves as a single pure component working fluid; the components cannot separate and create an unfavorable large temperature drop. There are numerous water-containing azeotropes. Some will create higher pH conditions inside the envelope, and others will create a lower pH condition; the pH shift of these fluids has important implications for the chemical compatibility of the fluid with containment materials. The propanol/water azeotrope and the pyridine/water azeotrope are good examples of possible choices for air conditioning systems. These fluid mixtures exhibit azeotropes at 30% to 50% by weight water content, and are relatively nontoxic.

Advantages of water-based azeotrope refrigerants over conventional refrigerants in reverse Rankine cycle air conditioning systems include at least the following points: 1) In each mixture, the vapor pressure curve is unique and different. For propanol/water, the vapor pressure is over 50% higher than water itself. This greatly increases its potential usefulness for air conditioning systems. 2) The mixtures exhibit freezing points as low as −100° C. or lower, thus creating a freeze resistant system. The propanol/water system does not begin to freeze until about −75° C. Additionally, the mixture does not expand upon freezing. 3) Azeotrope compositions do not separate during evaporation and condensation, thus the temperature drop in the device is as low as that observed for a pure component working fluid. 4) The refrigerant can continue to operate and carry heat at temperatures below 0° C. 5) The azeotrope working fluid wets untreated polymer material such as high-density polypropylene and polyethylene, whereas DI water does not wet these materials. This enables the use of lightweight materials. 6) Above 25° C., the water azeotropes exhibit high heat transport capability and thermodynamic efficiency, especially when compared to fluorocarbons. Because the heat of vaporization is over ten times higher than R-134A, the mass flow of refrigerant can be over ten times lower to effect the same cooling capacity in an air conditioner. The lower circulation rate translates directly to lower compressor power requirements. This is the basis for the energy savings and efficiency improvements. 7) The density change upon freezing can be nearly zero change for several azeotrope compositions. This truly offers freeze protection because it prevents the possibility of envelope failure due to freezing/thermal cycling. 8) Literature data indicates that these fluids would exhibit about 30% to 50% of the heat transport capability of water itself. In other words, its heat removal capability is still over ten times higher than R-134A. 9). Many of the water azeotropes should exhibit good chemical compatibility with the metal alloys currently used in air conditioning systems. They should also exhibit low toxicity and have sufficient water content to render them non-flammable and safe to use. 10) Perhaps the greatest advantage of water azeotrope refrigerants is their potential to eliminate or significantly reduce the damaging effects of refrigerants on the environment. Unfortunately, fluorinated refrigerants like R-134A have high global warming potentials (GWP), which has motivated a search for alternative refrigerants that are high performance, are non-flammable and possess low GWP. Many water-based azeotropes will be biodegradable, whereas R-134-A is essentially inert. Because it is also a greenhouse gas, its GWP is over 1000 times higher than carbon dioxide. In contrast, water azeotropes such as propanol/water and pyridine/water do not have long residual times in the environment. In combination with their capability to effect reduction in energy consumption, it is essential to evaluate such fluids for use in future air conditioning systems.

Additionally, these fluids can be metabolized and sequestered by plants, animals, and bacteria. The result is little or no greenhouse gas contribution. An example is the water/n-propanol azeotrope, which contains only water and n-propanol. In animals (including humans), n-propanol is digested in a manner similar to the route followed by ethanol (ethyl alcohol). In the human body, it is first converted to acetaldehyde, and then this acetaldehyde is converted into acetic acid radicals—also known as acetyl radicals. Acetic acid is the essential component of vinegar. The acetic acid radical is the combining form of acetic acid. This acetic acid radical combines with Coenzyme A to form acetyl-CoA. The acetyl-CoA then enters the Krebs Cycle, which is the basic powerhouse of the human body. Inside the Krebs Cycle, this acetyl radical is eventually broken down into carbon dioxide and water. The biodegradable properties of water azeotropes are thus illustrated. Reduced energy consumption and elimination of a significant greenhouse gas source are also direct benefits, especially for internet/server computer centers and related sites where large air conditioning loads are required for electronics cooling. Other applications may include electronics cooling and commercial building air conditioning systems, heat pipes and related devices.

Water-containing azeotropes can offer substantial benefits as alternatives to use of pure water for applications where freeze/thaw concerns exist. This includes many aerospace and commercial applications. As noted above, water is the best heat pipe working fluid between 300K and 500K, but the trait of expansion upon freezing creates a perceived large risk for potential users of the technology. In some embodiments, water-containing azeotropes can offer a unique solution to this drawback. As described above, an azeotrope is a mixture of two or more fluid components that exhibit a single sharp boiling point, wherein the chemical composition of the vapor and liquid is identical. Thus it behaves as a single pure component working fluid; the components cannot separate and create an unfavorable large temperature drop inside the device. There are numerous water-containing azeotropes. Some will create high pH conditions inside the heat pipe envelope, and others will create a low pH condition. It provides several key benefits for heat pipe operation.

In some embodiments, a copper heat pipe with propanol/water azeotrope working fluid is provided. It can include any wick structure, including sintered powder, axial grooves, or screen wick. Alcohol/water azeotropes will exhibit lower pH than de-ionized water; they are likely to be compatible with copper and copper alloys. Related known water-compatible copper alloys include 90/10 copper/nickel, 70/30 copper nickel, Monel 400, and Monel K-500.

In some embodiments, a pyridine/water azeotrope heat pipe is provided. Envelope materials may include aluminum 1100 alloy, pure magnesium, KIA magnesium alloy, 300 series stainless steel, CP-2 titanium, 15-3 titanium alloy, and Inconel 600. Pyridine/water exhibits a relatively high pH; the pH can be so high as to induce intrinsic passivation of envelope materials that are not compatible with water itself. This opens the possibility that chemically basic water azeotropes may exhibit favorable chemical compatibility with aluminum alloys, stainless steel alloys, magnesium alloys, and titanium alloys. The mixture is nominally 50% water/50% pyridine. Pyridine is a chemical base. It raises the pH enough (over one pH unit) to induce passivation on the wetted surfaces of the wick and envelope, thus suppressing and/or preventing hydrogen gas generation in magnesium and aluminum envelopes. The pyridine/water azeotrope offers the potential for compatibility with aluminum, titanium, magnesium, and stainless steel envelope materials.

In some embodiments, the water-based azeotrope reduces the freezing point to as low as −125 C, thus creating a freeze resistant water heat pipe. The pyridine/water azeotrope fluid does not begin to freeze until below −15 C, and not completely frozen until about −40 C. The n-propanol/water azeotrope does not begin to freeze down to −75 C, and is not completely solid until −125 C. The water-based azeotropes may freeze over a range of temperatures, and not necessarily at a sharp freezing point. This greatly reduces freeze-related induced stresses on the containment envelope, compared to water.

Azeotropic compositions do not separate during evaporation and condensation, thus the temperature drop in the device is as low as that observed for a pure component working fluid. In some embodiments, the heat pipe will continue to operate below 0 C, down to its freezing point.

The n-propanol/water azeotrope has a vapor pressure curve nearly 50% higher than water. This has a significant favorable effect on the heat transport capability, especially at lower operating temperatures. The 12 C boiling point depression of the azeotrope is the mixture property responsible for this effect. Water loop heat pipes do not work well below about 60 C. In some embodiments, the propanol/water azeotrope will work down to about 48 C, which is a similar vapor pressure to water at 60 C. The benefit is a device with a lower operating temperature capability than water.

The azeotrope working fluid wets untreated polymer porous wick material such as HDPP and HPPE. Above 25 C, the water-based azeotrope has a higher liquid transport factor than any other working fluid except water itself.

Use of a high-performance water azeotrope with a density change of zero or less may be provided, as a freeze/thaw protection feature. This feature makes the device relatively insensitive to fluid inventory, compared to water heat pipes. The density change upon freezing can be nearly zero change for several azeotrope compositions. This truly offers freeze protection because it prevents the possibility of envelope failure due to phase change with thermal cycling.

Above ambient temperature, several of these water-based azeotropes are capable of higher heat transport than ammonia. In fact, at 100 C they are capable of heat transport over five times higher than any known working fluid except water itself.

Because the water-based azeotrope vapor pressure is similar to water itself, in some embodiments the heat pipe/loop heat pipe envelopes do not need to be heavy wall construction. This enables more heat rejection for spacecraft with lower mass.

For spacecraft heat rejection, the higher operating temperature makes it possible to radiate much higher heat loads than ammonia heat pipe radiators operating at lower temperatures. For example, a radiator operating at 90 C is capable of rejecting 80% more heat than one operating at 40 C.

The composition of a working fluid described herein may be a composition where the mixture is close enough to the actual azeotrope composition such that the constant-pressure temperature difference between the vapor and liquid phases is less than 10 degrees Centigrade (or other values and ranges, such as less than 20 degrees Centigrade, less than 15 degrees Centigrade, less than 5 degrees Centigrade, less than 1 degree Centigrade etc., or a difference of less than 20%, 15%, 10%, 5%, 1%, etc.). As noted above, the working fluids described herein may be used for example in heat pipes, loop heat pipes, pulsating heat pipes, and reverse Rankine cycle air conditioning systems.

Although the invention has been described in detail with reference to certain preferred embodiments, variations and modifications exist within the scope and spirit of one or more independent aspects of the invention as described.

What is claimed is:

1. A thermal management system comprising:
a heat transport component; and
a water-based azeotropic mixture disposed within the heat transport component to move heat from one portion of the heat transport component to another;
wherein the mixture includes at least 50% water;
wherein the mixture includes both water and pyridine, wherein the heat transport component is a heat pipe, and wherein the mixture has substantially no change in volume upon freezing.

2. The thermal management system of claim 1, wherein the mixture has a liquid transport factor of greater than 1000 kW/cm$^2$ at 600K, wherein the liquid transport factor is defined by the product of a heat of vaporization by a surface tension by a liquid density, divided by a liquid viscosity ($\lambda \sigma \rho / \mu$).

3. The thermal management system of claim 1, wherein the pH of the mixture is greater than 11.2 at 25° C.

4. The thermal management system of claim 1, wherein the heat pipe includes a wick structure.

5. A thermal management system comprising:
a heat transport component; and
a water-based azeotropic mixture disposed within the heat transport component to move heat from one portion of the heat transport component to another;
wherein the mixture has a pH that is greater than 11.2 at 25° C.;
wherein the mixture includes water and pyridine, and wherein the heat transport component is a heat pipe.

6. The thermal management system of claim 5, wherein the mixture has substantially no change in volume upon freezing.

7. The thermal management system of claim 5, wherein the mixture is biodegradable.

8. The thermal management system of claim 5, wherein the heat pipe includes a wick structure.

9. A thermal management system comprising:
a heat transport component; and
a water-based azeotropic mixture disposed within the heat transport component to move heat from one portion of the heat transport component to another;
wherein the mixture includes at least 50% water;
wherein the mixture includes water and pyridine, wherein the heat transport component is a heat pipe, wherein the mixture has a liquid transport factor of greater than 1000 kW/cm$^2$ at 600K, wherein the liquid transport factor is defined by the product of a heat of vaporization by a surface tension by a liquid density, divided by a liquid viscosity ($\lambda \sigma \rho / \mu$).

* * * * *